S. W. BEACH.

Whip-Sockets.

No. 5,272.

Reissued Feb. 11, 1873.

Witnesses
John A. Ellis
Edward E. Ellis

Inventor
Sylvester W. Beach,
By
T. R. Alexander & Co.
Attys.

AM. PHOTO-LITHOGRAPHIC CO. N.Y. (OSBORNE'S PROCESS.)

UNITED STATES PATENT OFFICE.

SYLVESTER W. BEACH, OF YPSILANTI, MICHIGAN.

IMPROVEMENT IN WHIP-SOCKETS.

Specification forming part of Letters Patent No. 130,006, dated July 30, 1872; reissue No. 5,272, dated February 11, 1873.

*To all whom it may concern:*

Be it known that I, SYLVESTER W. BEACH, of Ypsilanti, in the county of Washtenaw and State of Michigan, have invented certain new and useful Improvements in Whip-Sockets; and I do hereby declare that the following is a full, clear, and exact description thereof, references being had to the accompanying drawing and to the letters of reference marked thereon, which form a part of this specification.

The nature of my invention consists, first, in an improvement upon the interior arrangement of a whip-socket for which Letters Patent No. 126,008 have been granted to me; and, second, in the construction and arrangement of a fastener or clip for fastening a whip-socket to the dash-board, all of which will be hereinafter more fully set forth.

In order to enable others skilled in the art to which my invention appertains, to make and use the same, I will now proceed to describe its construction and operation, referring to the annexed drawing, in which—

Figure 1:
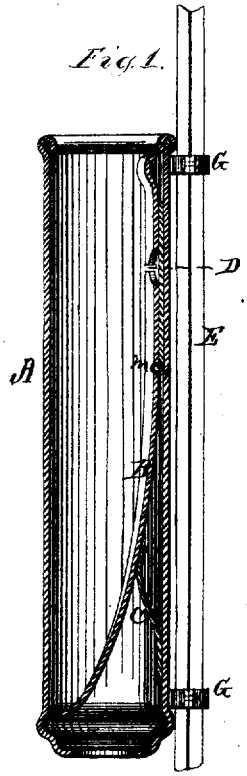
Figure 2:
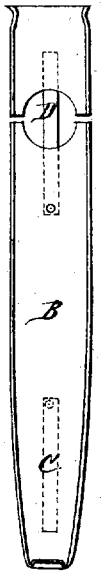
Figure 3:
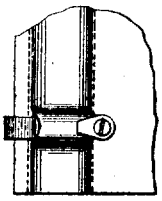
Figure 4:
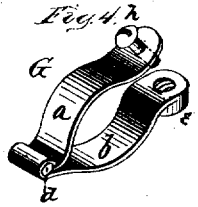

Figure 1 is a vertical section of my entire whip-socket. Fig. 2 is a front view of the jaw. Fig. 3 is a view of a part of the dash, showing the socket attached thereto; and Fig. 4 is an enlarged perspective view of the clip for fastening the whip-socket.

A represents the whip-socket, with an interior jaw, B, having a spring, C, at the bottom. This jaw and its spring are constructed and arranged substantially in the same manner as described in my patent above referred to, with the following exception: The jaw is cut off near the top and the two parts attached together by a steel spring, D. By the action of this spring, aided by the spring C at the bottom, the jaw will hold any-sized whip firmly in place. The top of the jaw falls below and is covered by the rim at the upper end of the socket. The jaw B is hinged just above the center of the socket A, as shown at *m*, so that as the whip presses down upon the lower end of the jaw the upper part of the jaw will be thrown out against the whip and assist in holding it firmer. The socket is fastened to the dash-board E by means of a hinged fastener, G, composed of two pieces, *a* and *b*. These two pieces are both curved or concavo-convex, as shown in Fig. 4. One end of the part *a* is turned or wrapped around a headed pin or rivet, *d*, the turn or bend of this part *a* being toward the outside. One end of the part *b* is then turned or wrapped around the thus-inclosed pin or rivet—this turn in the part *b* being toward the inside. This hinges the two parts together, so that they can be opened sufficiently to pass over the edge of the dash-board, and when put together form a clip, the outer ends of the two pieces being fastened together by a screw, *h*. This screw passes through the end of the part *a*, and screws into a nut, *e*, formed on or in the end of the part *b*. This part *b* is to be soldered or otherwise firmly secured to the whip-socket, and the clip slipped over the edge of the dash-board, the frame of the same passing into the clip, and the clip then fastened by the screw *h*.

Having thus fully described my invention, what I claim as new, and desire to secure by Letters Patent, is—

1. The jaw B, made in two parts, connected together by the spring D, and arranged, in combination with the spring C, within the socket A, substantially as shown and described, and for the purposes set forth.

2. The jaw B, in combination with the socket A, when the jaw is hinged to the socket, substantially as and for the purposes set forth.

3. The clip or fastening G, formed of the two parts *a* and *b*, constructed and hinged together as described, and provided with the nut *e* and screw *h*, substantially as and for the purposes herein set forth.

In testimony that I claim the foregoing as my own I affix my signature in presence of two witnesses.

SYLVESTER W. BEACH.

Witnesses:

SAMUEL POST,

SULLIVAN M. CUTCHEON.